(12) United States Patent
Hetschel

(10) Patent No.: US 10,994,343 B2
(45) Date of Patent: May 4, 2021

(54) CHANGER DEVICE FOR CLAMPING HEADS

(71) Applicant: HAINBUCH GMBH SPANNENDE TECHNIK, Marbach (DE)

(72) Inventor: Wilhelm Hetschel, Brackenheim (DE)

(73) Assignee: HAINBUCH GMBH SPANNENDE TECHNIK, Marbach (DE)

( * ) Notice: Subject to any disclaimer, the term of this patent is extended or adjusted under 35 U.S.C. 154(b) by 17 days.

(21) Appl. No.: 16/478,891

(22) PCT Filed: Jan. 12, 2018

(86) PCT No.: PCT/EP2018/050771
§ 371 (c)(1),
(2) Date: Jul. 18, 2019

(87) PCT Pub. No.: WO2018/137946
PCT Pub. Date: Aug. 2, 2018

(65) Prior Publication Data
US 2019/0381633 A1     Dec. 19, 2019

(30) Foreign Application Priority Data

Jan. 25, 2017    (DE) ...................... 10 2017 201 200.5

(51) Int. Cl.
*B23B 31/39*     (2006.01)
*B25B 7/12*     (2006.01)
*B23B 31/20*     (2006.01)

(52) U.S. Cl.
CPC ................ *B23B 31/39* (2013.01); *B25B 7/12* (2013.01); *B23B 31/20* (2013.01); *B23B 2231/2081* (2013.01); *B23B 2260/078* (2013.01)

(58) Field of Classification Search
CPC ... B25B 7/12; B23B 31/20; B23B 2231/2081; B23B 2260/078; B23B 2260/042; B23B 31/39; Y10S 279/901; Y10T 279/1993
See application file for complete search history.

(56) References Cited

U.S. PATENT DOCUMENTS 5,005,279 A * 4/1991 Kooiker .................. B23B 31/20
                                                279/901
5,087,059 A * 2/1992 Terwilliger ........... B25B 27/062
                                                279/139
(Continued)

FOREIGN PATENT DOCUMENTS

CN       102490152 A     6/2012
CN       103522088 A     1/2014
(Continued)

OTHER PUBLICATIONS

International Search Report issued in International Application No. PCT/EP2018/050771, with English translation, dated Apr. 9, 2018 (8 pages).

(Continued)

*Primary Examiner* — Eric A. Gates
*Assistant Examiner* — Paul M Janeski
(74) *Attorney, Agent, or Firm* — Flynn Thiel, P.C.

(57) ABSTRACT

A changer device for a clamping head having a base and pivoting elements pivotably articulated on the base and which in each case possess at least one engagement portion for impinging clamping jaws of the clamping head with a force. The changer device has a coupling transmission which per pivoting element possesses at least one coupling tab attached so as to be pivotably movable on the respective pivoting element. The changer device has a handle which for the purpose of simultaneous repositioning of the pivoting elements in relation to the base is movable in a relative manner. The handle is locationally fixed in relation to one of (Continued)

the coupling tabs such that a pivoting movement of the handle directly causes pivoting of the coupling tab and indirectly causes pivoting of the further coupling tab such that a pivoting movement of the pivoting elements and the engagement portions is caused.

12 Claims, 2 Drawing Sheets

(56) References Cited

U.S. PATENT DOCUMENTS

| | | | |
|---|---|---|---|
| 5,272,943 A * | 12/1993 | Edwards | B25B 13/48 81/176.15 |
| 6,983,522 B2 | 1/2006 | Weller et al. | |
| 7,434,302 B2 | 10/2008 | Hetschel | |
| 9,387,539 B2 | 7/2016 | Hangleiter et al. | |
| 9,878,376 B2 | 1/2018 | Haimer et al. | |

FOREIGN PATENT DOCUMENTS

| | | | |
|---|---|---|---|
| CN | 103813876 A | 5/2014 | |
| CN | 203817429 U | 9/2014 | |
| CN | 205519734 U | 8/2016 | |
| DE | 19812958 A1 | 9/1999 | |
| DE | 10138343 A1 | 2/2003 | |
| DE | 102004044848 A1 * | 3/2006 | ............ B23Q 7/043 |
| EP | 0566898 A2 | 10/1993 | |
| WO | 2006027269 A1 | 3/2006 | |

OTHER PUBLICATIONS

Written Opinion of International Searching Authority issued in International Application No. PCT/EP2018/050771, dated Apr. 9, 2018 (5 pages).
Office Action of German Patent Office issued in German Application No. 10 2017 201 200.5, dated Nov. 3, 2017 (6 pages).
Chinese Office Action issued in corresponding China Patent Application No. 201880008485.5, with English translation, dated Jul. 28, 2020 (15 pages).

* cited by examiner

CHANGER DEVICE FOR CLAMPING HEADS

TECHNICAL FIELD AND BACKGROUND

The invention relates to a changer device for clamping heads.

Such clamping heads serve for receiving workpieces during the machining, in particular during subtractive machining. Clamping heads which are to be capable of being changed by means of a generic changer device as well as a changer device according to the invention are distinguished by a plurality of clamping jaws which in the course of the clamping are repositioned in a converging manner in order for the workpiece that is disposed therebetween to be clamped on account thereof.

The clamping heads according to the intended use are clamped in a chuck which in most instances is part of a spindle that rotates when in operation. Inserting the clamping head into the chuck is usually performed in that the clamping jaws by means of the changer device are mutually impinged with a force, in particular in that said clamping jaws are compressed in a converging manner. Said clamping jaws in this compressed state can then be introduced into the chuck. As soon as the mutual impingement of the clamping jaws with a force is absent, the clamping jaws return to the radial initial relative position thereof in which said clamping jaws are then usually secured in a form-fitting manner against separating from the chuck.

A changer device which already has an obvious similarity with the changer device presently proposed is known from WO 2006/027269 A1. In the case of this changer device it is provided that by means of a plurality of knee levers a like number of pivoting parts can be synchronously pivoted in a manner driven by a support, wherein pins which cause the relative repositioning of the clamping jaws described above are also conjointly pivoted with the pivoting parts. The document mentioned as a possibility for driving the support proposes a hand wheel and a folding handle which act in each case on the support and by way of the latter indirectly on the pivoting elements.

The solution described in WO 2006/027269 A1 has in principle proven to be successful. Despite the already comparatively simple construction of said solution, there is however the requirement for a design that is even less complex and more favorable in terms of production technology.

OBJECT AND SUMMARY

It is an object of the invention to refine a generic changer device with a view to said changer device permitting particularly cost-effective production.

This changer device is configured for inserting a clamping head into a chuck and/or for removing the clamping head from the chuck, wherein such a clamping head has a plurality of clamping jaws which in a radial direction are mutually repositionable and which by means of the changer device in the radial direction in a mutually converging or mutually diverging manner are impingable with a force.

The changer device possesses a base and a plurality of pivoting elements which are articulated so as to be pivotable on the base and which in each case possess at least one engagement portion for impinging the clamping jaws with a force. Said changer device furthermore possesses a coupling transmission which per pivoting element possesses at least one coupling tab which is attached so as to be pivotably movable on the respective pivoting element, wherein the pivoting elements in terms of the movement thereof in relation to the base are coupled by way of the coupling tabs.

The changer device possesses a handle which for the purpose of the simultaneous repositioning of the pivoting elements in relation to the base is movable in a relative manner, wherein the handle to this end is configured so as to be locationally fixed in relation to one of the coupling tabs such that a pivoting movement of the handle directly causes pivoting of said coupling tab and indirectly causes the pivoting of the at least one further coupling tab. On account thereof, a pivoting movement of the pivoting elements and of the engagement portions provided thereon is caused, this leading to a clamping head coupled thereto being impinged with a force and in particular being compressed in such a manner that said clamping head is insertable into a chuck or is removable from the latter.

The pivoting elements of the changer device according to the invention, by way of the engagement portions of said pivoting elements, accordingly form parts of the changer device which are deflected by an indirect manual impingement with a force so as to, on account thereof, likewise deflect the clamping jaws of the clamping head. There are at least two such pivoting elements, the pivoting movement thereof being in each case caused by the coupling tab that is articulated on the pivoting element.

It is herein a particularity according to the invention that one of said coupling tabs is deflected directly on account of the repositioning of the handle in relation to the base. The handle and this particular coupling tab are connected directly and ideally even so as to be mutually integral. By contrast, the at least one other coupling tab is only indirectly conjointly moved since said other coupling tab by way of the coupling transmission is operatively connected directly or indirectly to the directly activated coupling tab.

This particularity mentioned above leads to a type of changer device which is particularly simple in terms of production. As compared to the construction mode which is known from WO 2006/027269 A1 mentioned at the outset, fewer individual parts are required, on the one hand. On the other hand, the complexity in terms of the assembly is also significantly reduced.

In principle, it is possible for the handle to be provided so as to extend in various directions. Said handle could thus extend so as to be substantially parallel to the central axis of the changer device, for example.

However, the handle preferably extends outward in the radial direction. This construction mode has been demonstrated to be particularly ergonomical. An extent in the radial direction is understood to mean that that portion of the handle that in the intended use is encompassed by the hand in the non-activated and/or in the activated state, conjointly with the exact radial direction, encloses an angle of not more than 30°. It is in particular advantageous for the handle to extend beyond a central axis of the changer device in the radial direction, so as to point toward the opposite side of the changer device, so to speak.

A counter handle which, in relation to the handle, is spaced apart in such a manner that both handles can conjointly be encompassed by one hand is preferably provided. This counter handle also preferably extends outward in the radial direction. Conjointly with the handle, the counter handle permits the changer device to be activated in a particularly ergonomical manner and thus to impinge a clamping head coupled thereto with a force for a purpose of insertion or removal. The counter handle is preferably spaced apart from the handle in such a manner that said counter handle in the activated as well as in the non-activated state can conjointly with the handle be encompassed by the hand of an adult. In the non-activated state, the spacing between the handle and the counter handle, or the regions for gripping the handles that are in each case provided thereon, respectively, is preferably less than 10 cm.

The handle and the counter handle are preferably disposed relative to one another in such a manner that said handles, by being mutually converged, impinge the clamping jaws of the clamping head that is coupled to the changer device in a radially inward manner with a force and thus establish the insertion state or the retrieval state.

The counter handle is preferably fixedly attached to the base.

The changer device preferably possesses at least three pivoting elements which possess in each case at least one engagement portion. Even when two pivoting elements may suffice for deflecting two clamping jaws in the case of particular construction modes, clamping heads usually possess three ore-f four clamping jaws. Accordingly, at least the mentioned three pivoting elements or even four pivoting elements are preferably provided on the changer device, wherein again only one of said pivoting elements possesses a pivoting tab which is directly connected to the handle, while all other pivoting elements are repositioned indirectly by way of the coupling transmission and the respective coupling tabs.

Various construction modes are conceivable for the coupling transmission, wherein construction modes in which the coupling tabs of the different pivoting elements are attached to one another so as to be directly movable are in particular also conceivable. However, the coupling transmission preferably possesses a coupling slide which in particular is guided in a linear manner and to which the coupling tabs are in each case attached so as to be pivotably movable. Said coupling slide advantageously causes the synchronization of the coupling tabs which are attached to said coupling slide. The repositioning of the coupling slide is caused by way of the one coupling tab which is directly impinged with a force by the handle, said repositioning in turn causing the corresponding repositioning of the other coupling tabs and thus the pivoting of the other pivoting elements.

The pivoting elements are preferably articulated on the base by way of a pivoting element axis which is locationally fixed in relation to the respective pivoting element and to the base. This construction mode is comparatively simple, although there clearly are alternatives. The pivoting movement capability of the pivoting elements in relation to the base could thus also be caused, for example, by double tabs which in a pivotably movable manner are attached to the base and to the pivoting element, which would enable a more flexible establishment of the pivoting path of the pivoting elements. However, the direct linkage is advantageous with a view to the primary focus of achieving a particularly favorable changer device.

The guiding of the coupling slide is preferably performed by means of a guide duct on the base, the coupling slide being guided so as to be movable in a sliding manner in said guide duct. Said guide duct furthermore preferably has an inward-pointing guide wall which has at least two slot-shaped through holes for the coupling tabs. The guide duct mentioned is preferably provided so as to be centric in the base and can be configured as a guide duct which is open only on one side, or as a continuous guide duct. The coupling slide is guided therein, wherein particularly exact or tight guiding is not relevant since a perfect synchronization between the coupling tabs that are attached to the coupling slide is usually not required.

The slot-shaped through holes that are preferably provided in the inward-pointing guide wall are preferably adapted to the coupling tabs and the width of the latter in such a manner that only little play remains herein. This is advantageous in particular in the region of that coupling tab which is directly impinged with a force by the handle, so as to avoid any tilting or the like and to guide the handle in a smooth manner.

The engagement portions are preferably provided as pin-shaped appendages on a lower end of the pivoting elements, wherein at least two pin-shaped appendages are preferably in each case provided on each of the pivoting elements.

BRIEF DESCRIPTION OF THE DRAWINGS

Further advantages and aspects of the invention are derived from the claims and from the description hereunder of a preferred exemplary embodiment of the invention which is explained hereunder by means of the figures in which:

DETAILED DESCRIPTION OF THE EXEMPLARY EMBODIMENT

Figure 1:
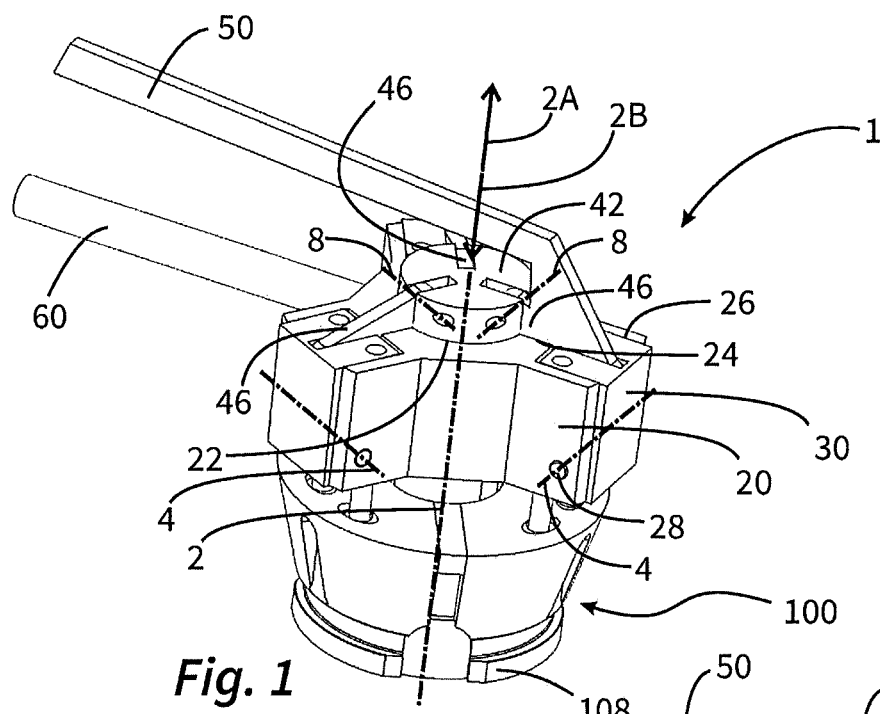
FIG. 1 shows a changer device according to the invention together with a clamping head which is capable of being handled by said changer device and which in the intended use in operation is inserted into a chuck.

FIG. 1 shows a changer device 10 according to the invention including the clamping head 100 which according to the intended use is to be manipulated by said changer device. The changer device 10 possesses a base 20 which so to speak accounts for the primary component part of the changer device 10. Said base 20 possesses three outriggers which extend radially in relation to a central axis 2 and which are in each case mutually spaced apart by 120°. A recess 26 which is open in a radially outward manner and in which a pivoting element 30 is disposed is provided on each of said outriggers. The base 20, in a centrical manner, possesses a guide duct 22 in which a coupling slide 42 as a central element of a coupling transmission 40 is disposed.

The pivoting elements 30 by means of pins 28 are in each case articulated on the base 20 so as to be pivotably movable about pivoting element axes 4. The coupling slide 42 in relation to the base 20 is movable in a linear manner along the central axis in the direction of the arrows 2A and 2B. The coupling slide 42 and the pivoting elements 30 are connected to one another by way of coupling tabs 46 which are articulated so as to be pivotable about pivot axes 6 on the pivoting elements 30 and about pivot axes 8 on the coupling slide 42. The coupling 46 tabs are located in respective slot-shaped openings 24. This fundamental constellation leads to a linear repositioning of the coupling slide 42 in relation to the base 20 causing conjoint pivoting of the coupling tabs 46 and thus likewise conjoint pivoting of the pivoting elements 30. In order for this pivoting movement of the coupling tabs 46 to be caused, one of the coupling tabs 46 is connected directly to a handle 50 which is pivotable in relation to a counter handle 60 which is fixed on the base, so as to on account thereof be able to conjointly pivot all three pivoting elements 30.

Figure 2:
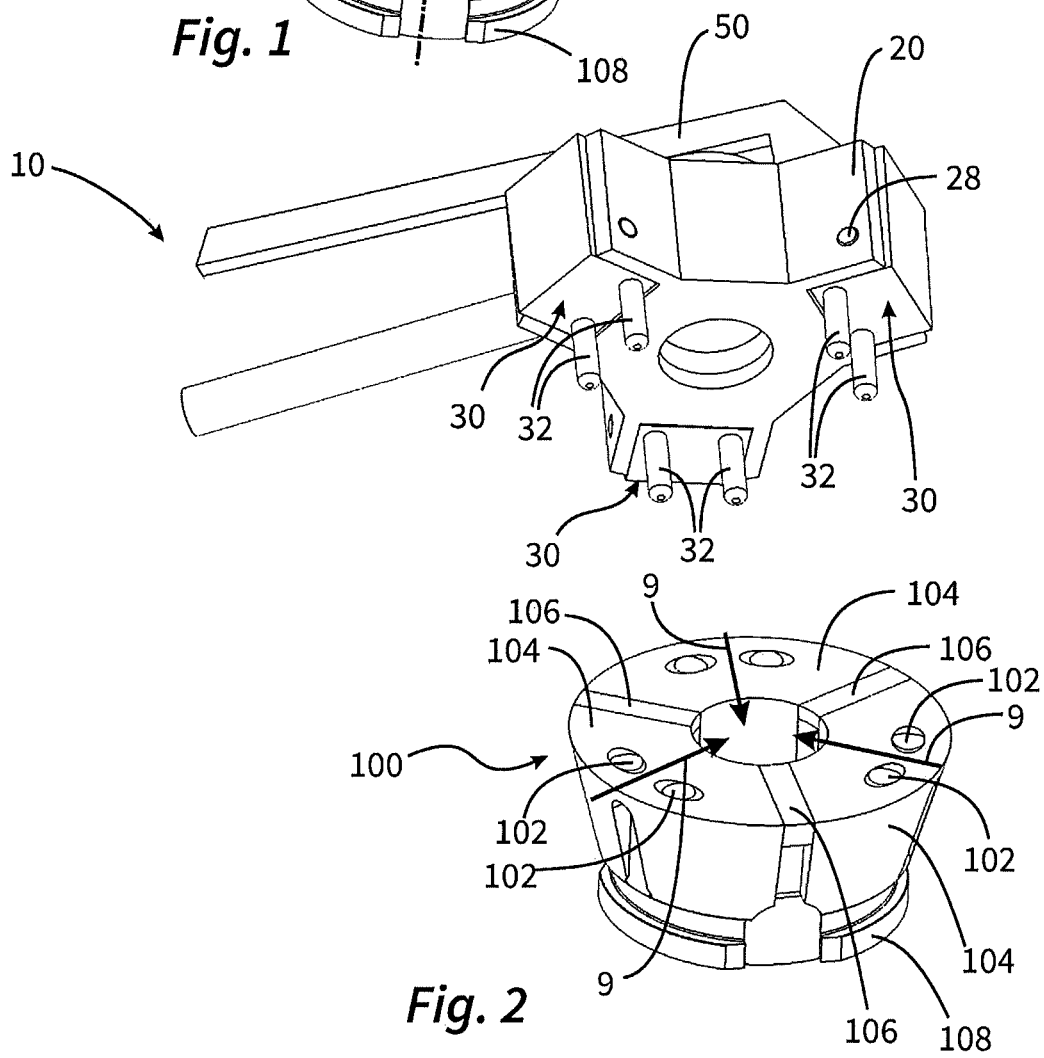
FIG. 2 shows the changer device as per FIG. 1 in an illustration from below as well as the clamping head from above so that the manner of the interaction becomes evident.

As can be seen by means of FIG. 2, engagement portions 32 in the form of pins are in each case provided on the lower side of the pivoting elements 30. In a manner corresponding to bores 102 in the clamping jaws 104 of the clamping head 100, said engagement portions 32 are disposed in pairs. The clamping jaws 104 are connected to one another by connection portions 106 from an elastic material such that said clamping jaws 104 can be pressed in the radial direction 9, counter to a spring force caused by said elastic material. In the compressed state, holding webs 108 provided on the clamping jaws 104 are then likewise sufficiently compressed in order for an insertion or removal, respectively, of the clamping head 100 into or from a chuck (not illustrated) to be possible in this instance.

The interaction will be explained once again with reference to FIGS. 3A and 3B. These figures show a section through the changer device 10 along the direction of extent of the handle 50 and of the counter handle 60. For clarification it is to be understood that the sections would appear identical when rotated by 120° or 240°, respectively, about the central axis, except for the arrangement of the handle 50 and of the counter handle 60.

Figure 3A:
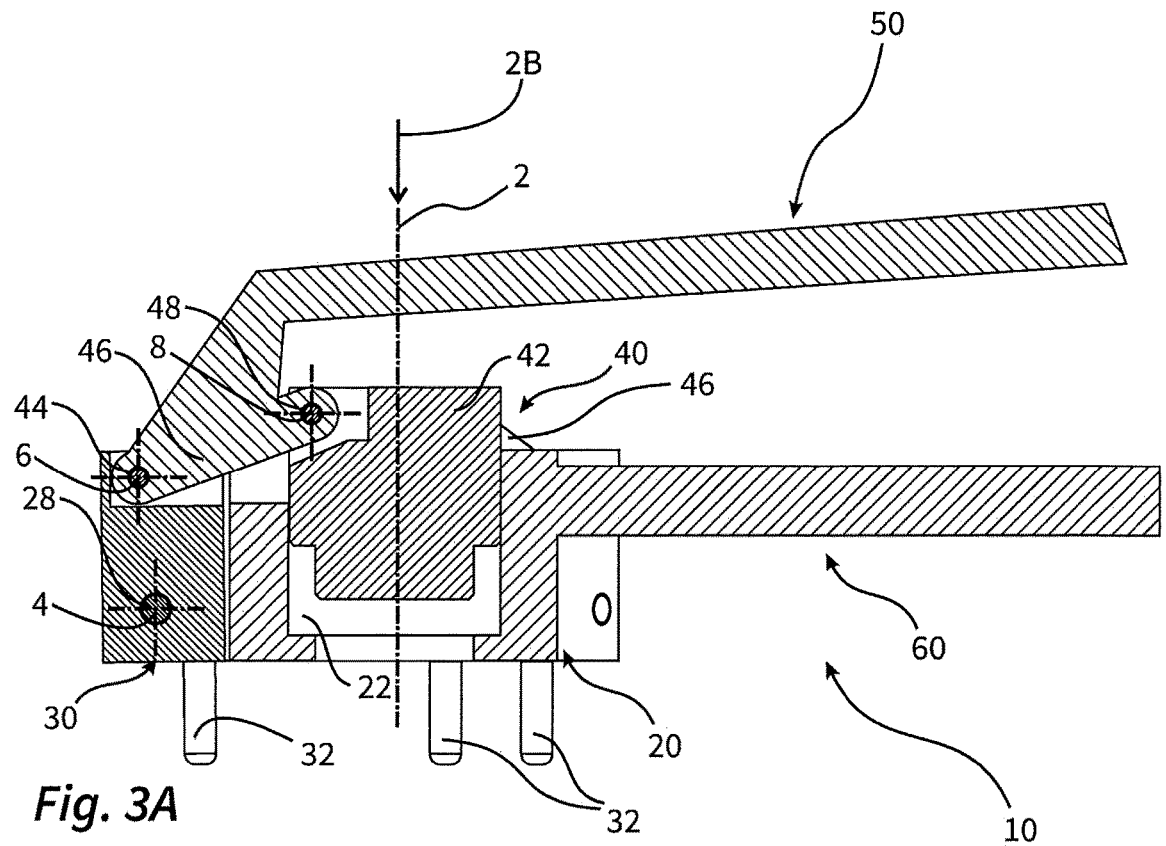
FIGS. 3A and 3B show the changer device in a sectional illustration in the non-activated state and in the activated state for the purpose of a changing procedure.
Figure 3B:
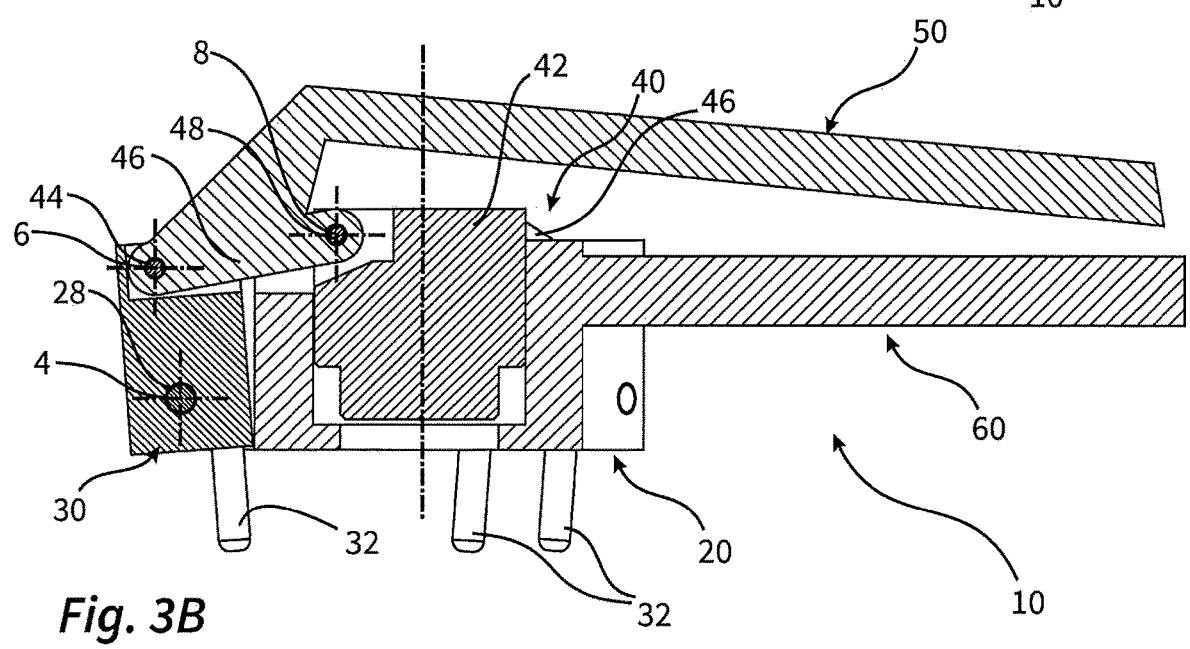

FIG. 3A shows the non-activated state of the changer device 10. When the handle 50 and the counter handle 60 now are conjointly gripped by the hand of the operator and converged, this leads to pivoting of the coupling tab 46 shown in a sectional manner in FIG. 3A.

The coupling tab 46 is attached so as to be pivotably movable about the pivot axis 8 on the coupling slide 42, the latter being movable in a linear manner along the central axis 2. Said pivot axis 8 is defined by a pin 48 which is received in bores of the coupling tab 46 and of the coupling slide 42.

The coupling tab 46 is furthermore attached so as to be pivotably movable about the pivot axis 6 on the pivoting element 30. Said pivot axis 6 is defined by a pin 44 in bores of the pivoting element 30 and of the coupling tab 46. The pivoting element 30 itself is attached so as to be pivotable about the pivoting element axis 4 on the base.

The pivoting of the coupling tab 46 by virtue of said linkages leads to a downward repositioning of the coupling slide 42 in the direction of the arrow 2B as well as to a radially inward pivoting of the engagement portions 32 of the pivoting element 30. The two other coupling tabs 46 by way of the coupling slide 42 are also pivoted to approximately the same extent as the coupling tab 46 that is fastened to the handle 50 such that the two pivoting elements 30, which are conjointly moved only in an indirect manner, are also pivoted and the respective engagement portions 32 of the latter are repositioned in a radially inward manner.

With reference to FIG. 2, in the case of a clamping head 100 coupled thereto, this leads to the external diameter shrinking in the region of the holding web 108 and the clamping head 100 thus being able to be removed from the chuck or to be inserted into the latter.

The invention claimed is:

1. A changer device for clamping heads, the changer device comprising the following features:
    the changer device is configured for inserting a clamping head into a chuck and/or for removing the clamping head from the chuck, wherein the clamping head has a plurality of clamping jaws which are repositionable relative to one another in a radial direction, the changer device forcibly acting on the clamping jaws to displace the clamping jaws towards or away from one another in the radial direction;
    the changer device comprises a base;
    the changer device comprises a plurality of pivoting elements which are articulated so as to be pivotable on the base, each pivoting element comprising at least one engagement portion for forcibly acting on the clamping jaws;
    the changer device comprises a coupling transmission, the coupling transmission comprising at least one coupling tab for each said pivoting element, each coupling tab being attached so as to be pivotably movable on the respective pivoting element, wherein the pivoting elements in terms of movement thereof in relation to the base are coupled by way of the coupling tabs;
    the changer device comprises a handle which is movable for a purpose of simultaneous repositioning of the pivoting elements in relation to the base; and
    the handle is configured so as to be locationally fixed in relation to one of the coupling tabs such that a pivoting movement of the handle directly causes pivoting of said one coupling tab and indirectly causes pivoting of at least one further coupling tab such that a pivoting movement of the pivoting elements and of the engagement portions thereof is caused.

2. The changer device as claimed in claim 1,
    wherein the handle extends outwardly in the radial direction.

3. The changer device as claimed in claim 2, wherein the handle extends beyond a central axis of the changer device in the radial direction.

4. The changer device as claimed in claim 1, further comprising
    a counter handle disposed in opposed and spaced relation with the handle.

5. The changer device as claimed in claim 4, wherein
    the counter handle extends outwardly in the radial direction and/or
    the counter handle is fixedly attached to the base.

6. The changer device as claimed in claim 4, wherein the counter handle is spaced from the handle by less than 10 cm to permit both the handle and the counter handle to be encompassed with one hand.

7. The changer device as claimed in claim 1, wherein the plurality of pivoting elements comprises at least three pivoting elements, each of the pivoting elements comprising at least one engagement portion.

8. The changer device as claimed in claim 1, wherein
    the coupling transmission comprises a coupling slide which is guided in a linear manner and to which the coupling tabs are attached so as to be pivotably movable.

9. The changer device as claimed in claim 8, further including a guide duct on the base for
    guiding of the coupling slide, the coupling slide being guided so as to be movable in a sliding manner in said guide duct.

10. The changer device as claimed in claim 9, wherein the guide duct has an inner guide wall with at least two slot-shaped through holes for accommodating the coupling tabs.

11. The changer device as claimed in claim 1, wherein the pivoting elements are articulated on the base about a pivoting element axis which is locationally fixed in relation to the respective pivoting element and to the base.

12. The changer device as claimed in claim 1, wherein the engagement portions comprise pin-shaped appendages disposed on lower ends of the respective pivoting elements, and at least two pin-shaped appendages are disposed on each of the pivoting elements.

* * * * *